Oct. 21, 1969    JAMES E. WEBB    3,473,758
ADMINISTRATOR OF THE NATIONAL AERONAUTICS
AND SPACE ADMINISTRATION
ROLL-UP SOLAR ARRAY

Filed Nov. 9, 1967    3 Sheets-Sheet 1

INVENTOR.
HERMAN P. VALENTIJN
BY
ATTORNEYS.

Oct. 21, 1969    JAMES E. WEBB    3,473,758
ADMINISTRATOR OF THE NATIONAL AERONAUTICS
AND SPACE ADMINISTRATION
ROLL-UP SOLAR ARRAY

Filed Nov. 9, 1967    3 Sheets-Sheet 2

INVENTOR.
HERMAN P. VALENTIJN
BY
ATTORNEYS.

INVENTOR.
HERMAN P. VALENTIJN
BY
ATTORNEYS.

United States Patent Office 3,473,758
Patented Oct. 21, 1969

3,473,758
ROLL-UP SOLAR ARRAY
James E. Webb, Administrator of the National Aeronautics and Space Administration, with respect to an invention of Herman P. Valentijn, Los Angeles, Calif.
Filed Nov. 9, 1967, Ser. No. 681,687
Int. Cl. B64g 1/10, 9/00
U.S. Cl. 244—1                              10 Claims

ABSTRACT OF THE DISCLOSURE

A plurality of arcuate solar panels for a spacecraft each are furled on a tapered drum to stow them during launching. When the solar panels are to be used in outer space, the drums are rotated to extend the arcuate panels out from and around the spacecraft. An arcuate hollow beam along each panel edge stiffens the cantilevered panel. The beams are flattened as they are coiled on the drum and return to their hollow shape as they are uncoiled. Serrations in the beams avoid overstressing as the bears are flattened and opened.

ORIGIN OF THE INVENTION

The invention described herein was made in the performance of work under a NASA contract and is subject to the provisions of Section 305 of the National Aeronautics and Space Act of 1958, Public Law 85–568 (72, Stat. 435; 42 USC 2457).

BACKGROUND OF THE INVENTION

This invention relates to panels of solar cells for spacecraft and, more particularly, to arrangements in which the solar panels are selectively extended outward from the spacecraft into operative position.

Solar cells have proven to be effective and reliable in generating electrical power for spacecraft. Since each cell generates a relatively small amount of power, however, a large number of cells are needed for some spacecraft. It becomes a problem to provide such a large number of solar cells within the confines of the spacecraft, so the cells are placed on panels which extend out from the craft. Because the panels may be quite large, it generally is necessary to store the panels in retracted position while the spacecraft is being launched. The panels of cells then are not extended until the craft is beyond the earth's atmosphere and has stabilized.

One design for selectively deploying the panels provides a substantially rigid panel array which is stored in folded vertical position and then lowered into operating position after the spacecraft shroud has been jettisoned. That design generally is not satisfactory, however, when very large panel areas are required.

Another approach to deploying the panels is a roll-up system using a plurality of rollers each of which ras a long narrow panel of solar cells coiled on it. The rollers can be rotated on command to extend the panels laterally from the spacecraft like radial spokes from a hub. Since the extended panels are to be cantilevered from the spacecraft, a stiffening beam is required along each edge of each panel.

While a roll-up device is a good approach to the problem, in order to provide sufficient panel area for generating large amounts of electrical power, the panels may need to be quite long.

The natural vibration frequency of the array decreases rapidly as the array is extended further out from the spacecraft. In order to prevent resonance, the natural frequency of the array should be kept higher than the maximum vibration frequency which the spacecraft may develop and pass on to the array. Therefore, resonance problems can result if the panels extend too far out from the craft.

SUMMARY OF THE INVENTION

This invention provides a roll-up solar array in which the panel, when in operative position, extends arcuately out from and around the spacecraft so that the most remote portion of the panel is not nearly so far from the center of the craft as if the panel extended straight out. A plurality of the arrays may be disposed at spaced locations around the periphery of the spacecraft to surround the craft with solar panels.

Structurally, each of the roll-up arrays includes an arcuate flat solar cell panel adapted to be coiled on a tapered roller. A pair of arcuate hollow beams are connected to each edge of the panel to stiffen it and support it as it is cantilevered from the spacecraft. In order to reduce the effort required to coil the assembly and minimize the space occupied by the coiled beams, the beams are flattened in height when they are coiled on the roller. They then return to their original height as they are extended, so as to provide the desired stiffness.

Flattening and opening the beam changes its width, and because the beam is arcuate, substantially changes the length of the radially inner and outer edges. Therefore, a plurality of serrations are formed to extend a substantial distance across the width of each beam. The serrations relieve stress as the arcuate beam is flattened and opened to avoid overstressing it.

Preferably, the cross-sectional configuration of each beam includes a central generally oval hollow portion, and a flat flange on each side of the hollow portion. The panel preferably is connected to the bottom or top of the oval, and the serrations extend alternately from opposite sides through the flanges about to the line of panel attachment. As the hollow beam portion is flattened, the radially outer flange moves outward and the width of the serrations on that side increases, while the radially inner flange moves inward and the width of serrations on that side decreases. The line of panel attachment does not move radially, so that the panel need not change in width.

Thus, the device of this invention provides an arcuate roll-up solar array which can present a large panel of solar cells relatively close to the spacecraft, and yet permits the use of a collapsible beam structure for stiffening the deployed arcuate array.

These and other features, objects, and advantages of this invention will be apparent from the following detailed description of a preferred embodiment when read with reference to the accompanying drawings.

DETAILED DESCRIPTION OF A PREFERRED EMBODIMENT

Figure 1:
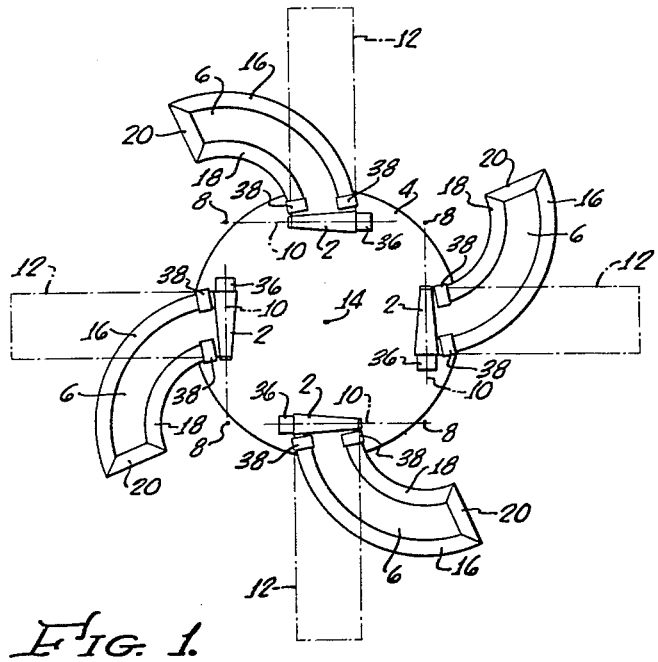
FIGURE 1 is a plan view illustrating an exemplary spacecraft having four solar panel arrays constructed in accordance with this invention, the panels being disposed in the deployed position, and, in phantom, illustrating the position of straight panels of comparable area.

As illustrated in FIGURE 1, an exemplary spacecraft has four frusto-conical rollers 2 rotatably mounted at equally spaced locations around the periphery of a platform 4 which may form the base of the craft. Each of the rollers or tapered drums 2 has an arcuate panel 6 of solar cells connected to it. Each panel is adapted to be coiled on a respective one of the rollers 2 as the roller is rotated in one direction, and to be extended in an arcuate configuration as the roller is rotated in the opposite direction. Thus, the panels are furlable for storage and deployable for use in space. Each of the deployed arcuate solar panels 6 extends out from and partially around the spacecraft, actually being centered around a point 8 on the extended axis 10 of the tapered drum. Thus each of the panels extends arcuately out from and along the axis 10 rather than directly away from the axis.

The phantom lines 12 in FIGURE 1 illustrate the position which would be assumed by straight solar panels of area substantially equal to the arcuate panels if the straight panels 12 were extended radially out from the spacecraft. It can be seen that the distance from the center 14 of the spacecraft to the most remote portion of the straight panel would be substantially greater than the distance from the center of the craft to the most remote portion of the arcuate panel. Keeping the panels in closer to the spacecraft as is accomplished by the use of arcuate panels, greatly reduces the support and vibrational problems of the panels.

An arcuate beam 16 and 18 extends along each side of the solar panel 6 to stiffen the panel and support it when it is cantilevered from the spacecraft. A similar beam 20 extends across the outboard end of the solar panel to further rigidify the panel.

Figure 2:
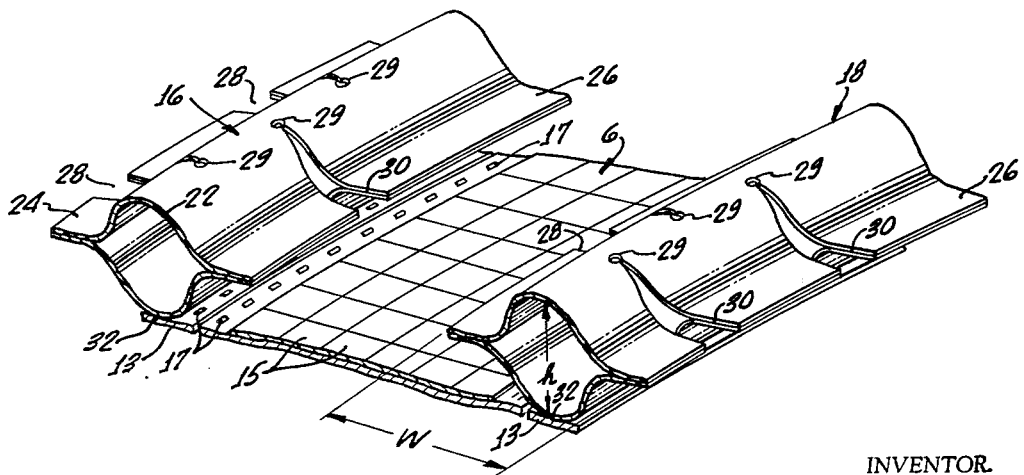
FIGURE 2 is a perspective view of a portion of one of the deployed solar panels.
Figure 3:
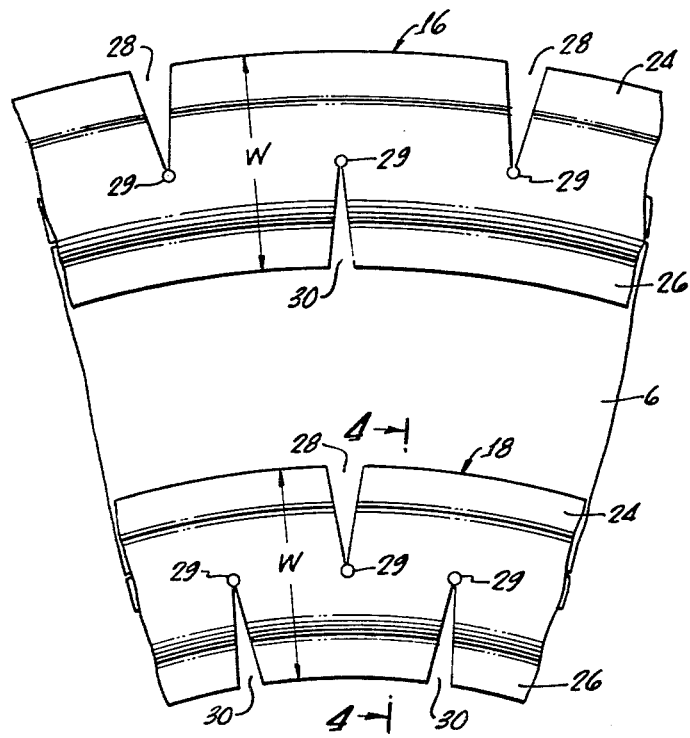
FIGURE 3 is a plan of the solar panel portion illustrated in FIGURE 2.
Figure 4:
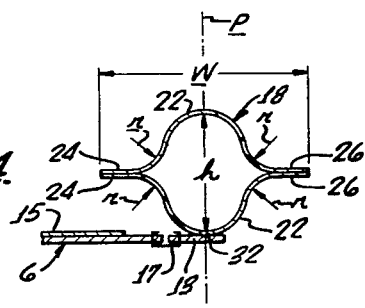
FIGURE 4 is a cross-sectional view through one of the beams and a portion of the panel taken generally along lines 4—4 of FIGURE 3.

Referring now to FIGURES 2–4, the substrate of each arcuate panel 6 is a material such as a resin impregnated fiberglass which is sufficiently flexible in a direction inclined to the plane of the panel for coiling on the drum, but is quite restricted in its ability to deform in its own plane. A large number of solar cells 15 for converting solar energy into electrical energy are disposed on at least one side of the panel. An elongate arcuate slotted fastening strip 13 at each edge of the panel 6 is connected to the substrate by clips 17 extending into slots in the substrate and the strip 13.

Each of the arcuate beams 16 and 18 has a substantial width $w$ and height $h$, and is assembled from a pair of mirror-image beam halves. The cross-section of each beam half includes a central portion 22 of semi-circular configuration, the open end of which is reverse-bent about radii $r$ to terminate in a pair of outwardly directed flanges 24 and 26. The flanges of the two beam halves mate and are suitably fastened together, for example, by welding to form a composite beam having a hollow, central portion of generally oval cross-sectional configuration and a pair of outwardly extending side flanges.

A plurality of wedge shaped serrations 28 and 30 extend from the edge of each beam flange 24 and 26 to approximately the central plane P of the beam, the serrations 28 and 30 alternating on opposite sides of the beam at spaced locations along its length. A small circular hole 29 is located at the inner points of the serrations.

Each beam 16 and 18 is coextensive with a respective side edge of the arcuate solar panel 6, and is suitably fastened to that edge by welding the fastening strip 13 to the beam generally along the vertex 32 of one beam half. Thus, the serrations 28 and 30 extend from both sides of the beam to about the line of attachment of the solar panel.

Figure 5:
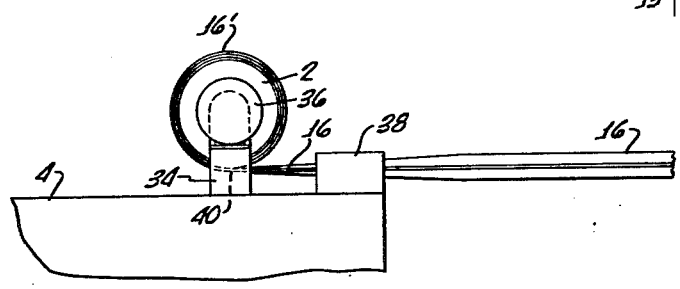
FIGURE 5 is a partial elevation view illustrating one of the tapered drums with a solar panel array partially coiled on the drum and partially extended in deployed position.

Referring now to FIGURE 5, each tapered drum 2 is rotatably mounted on the spacecraft in a suitable support 34. A motor 36 is operably connected to rotate the drum 2 in either direction upon receiving a radio signal transmitted from a remote command station. In the example shown, a separate motor 36 is illustrated for each drum, although a single motor with an inter-connecting drive system could be used. A pair of guides 38 (see also FIGURE 1) mounted outboard of each tapered roller receive the arcuate beams 16 and 18 and guide the solar array as it is coiled on the drum and uncoiled to the deployed position. These guides 38 are also constructed so as to assist in supporting the cantilevered beams in the deployed position.

Figure 6:
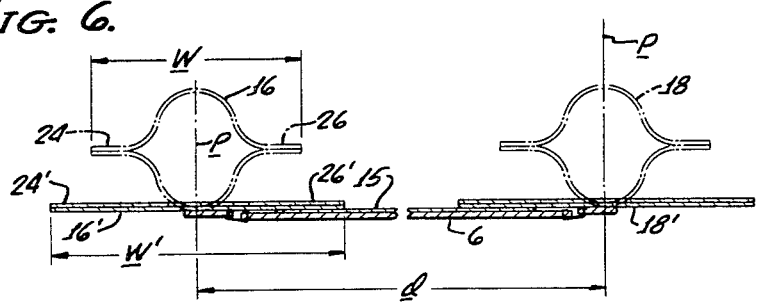
FIGURE 6 is a cross-sectional view through one of the solar panels showing the stiffening beams in the flattened position for coiling on the drum, and in phantom, showing the beams in the opened position for stiffening the deployed panel.

The beams 16 and 18 preferably are fabricated of a resilient, thin metal, e.g. sheet titanium. As the panel is coiled on the drum, the hollow beams are flattened in height $h$ by pressure from the drum as the beams contact the drum tangent point 40. The flattened position 16' and 18' of the hollow beams is illustrated in FIGURE 6. The bending strength of the beams in a direction normal to the panel surfaces is greatly reduced when the beams are flattened, so that the flattened beam is easily coiled on the drum.

Figure 7:
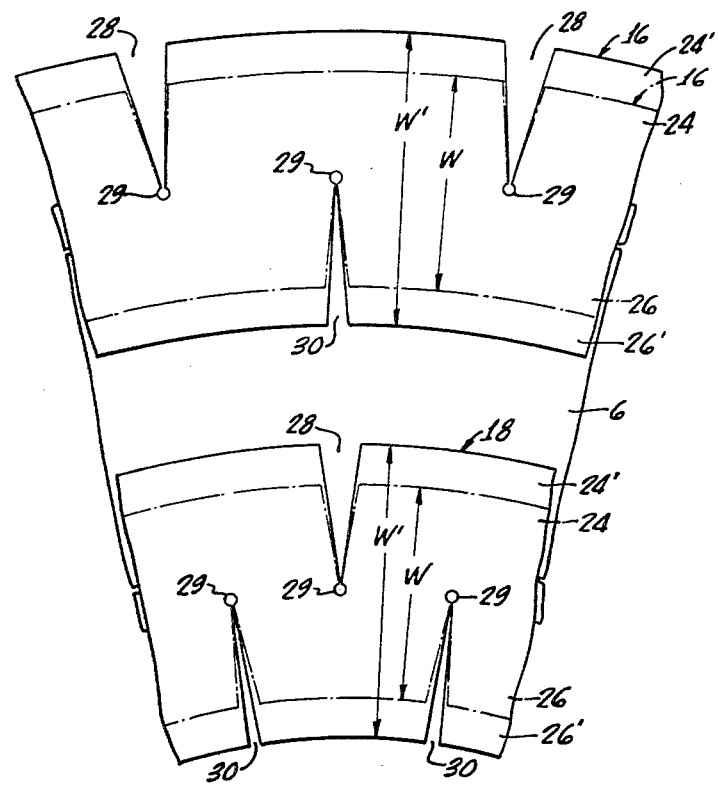
FIGURE 7 is a partial plan view of a portion of the solar panel illustrating the beams in the flattened position, and in phantom, illustrating the beams in the opened position.

From FIGURES 6 and 7, it can be seen that as each beam is flattened in height, it spreads in width from $w$ to $w'$ moving laterally in both directions from the plane P of attachment to the solar panel. Thus, the outer flange 24 of the outer beam 16 will be moved to position 24' further away from the arcuate beam's center of curvature so that the radius of curvature and, correspondingly, the length of that flange must increase. The serrations 28 accommodate that lengthening of the beam outer flange and relieve tension during the flattening process. Similarly the inner flange 26 of the outer beam 16 will be moved to position 26' closer to the beam's center of curvature so that the radius of curvature and length of that flange must decrease. This shortening of the inner flange is also accommodated by the inner serrations which relieve flange compression as the beam is flattened. The effect on the inner beam 18 will, of course, be similar.

As the panels 6 are uncoiled from the drums 2, the inherent resiliency of the beam structure causes it to return substantially to its original open shape, and again the serrations 28 and 30 adjust to avoid overstressing of the beam metal. The distance $d$ between the lines of attachment P of the panel to the two beams does not change as the beam is flattened or opened so that no transverse stress is placed on the solar panel 6. The spacing and size of the serrations is selected as necessary to hold the stress in the beam within tolerable limits.

In operation, each of the arcuate solar arrays 6 is coiled on its respective drum 2 prior to launching the spacecraft. The beams 16 and 18 thus are in the flattened position. The spacecraft is then launched with the solar panels furled where they will not be harmed by the rapid acceleration of the spacecraft during the launching operation. After the craft is in outer space, and its acceleration has decreased, a radio command is given from earth to operate the four motors 36. Each of the tapered rollers 2 is thus rotated to extend the solar panel 6 arcuately from the spacecraft. As the beams 16 and 18 come off the rollers, and through the guides 38, they gradually return to their original hollow configuration to support the cantilevered solar panel. As the beams open, the serrations 28 and 30 adjust to avoid overstressing the beam.

Thus, this invention provides a roll-up solar array which is readily stored or deployed as required, and provides a very large panel area relatively close to the spacecraft. Moreover, the serrated beam structure provides the required rigidity while permitting furling of the arcuate array.

What is claimed is:
1. A deployable solar array for a spacecraft comprising:
   a plurality of frusto-conical rollers rotatably mounted at spaced locations on said spacecraft;
   an arcuate panel connected to each roller and adapted to be coiled on the roller as the roller is rotated in one direction and to be deployed in an arcuate configuration out from and around the spacecraft as the roller is rotated in the opposite direction; and
   a plurality of solar cells on at least one side of each panel, said one side of all the panels facing generally in the same direction when the panels are deployed.
2. A deployable solar array for a spacecraft in accordance with claim 1 and further comprising:
   an arcuate beam extending along and connected to each side edge of each panel to stiffen and support the cantilevered panel.
3. A deployable solar array for a spacecraft in accordance with claim 2 wherein each beam includes:
   an arcuate hollow body portion;
   a plurality of serrations extending alternately from opposite edges of the beam into the hollow body portion; and
   means connecting the panel of solar cells to each beam along the beam hollow body portion.
4. A deployable solar array for a spacecraft in accordance with claim 3 wherein each beam further includes:
   flanges generally parallel to the panel extending from opposite sides of the body portion.
5. A deployable solar array for a spacecraft in accordance with claim 3 wherein:
   the upper and lower surfaces of the beam hollow body portion are curved in cross sectional configuration;
   the panel is connected to one of said surfaces at the vertex of the curve; and
   the serrations extend from each side edge of the beam to adjacent the line of panel attachment.
6. A deployable solar array for a spacecraft in accordance with claim 3 wherein:
   each beam is composed of resilient sheet metal; and
   each panel is of material selected so that it can be coiled about an axis inclined to its large surfaces, but strongly resists bending in its own plane.
7. A roll-up array comprising:
   a tapered roller rotatably mounted on a base;
   an arcuate panel connected to the roller and adapted to be furled on the roller as the roller is rotated in one direction and unfurled to extend arcuately out from and along the roller axis as the roller is rotated in the opposite direction; and
   an arcuate beam extending along and connected to each side edge of the panel to stiffen and support the cantilevered panel.
8. A roll-up array in accordance with claim 7 wherein:
   the arcuate beams are hollow and each have substantial width and height, being flattened in height as they are coiled on the roller and returning to their original height as they are uncoiled; and
   each beam includes a plurality of serrations at spaced locations along its length and extending a substantial distance across its width to permit flattening of the beam without overstressing it.
9. An extensible beam device comprising:
   a tapered drum adapted to rotate about an axis;
   an elongate hollow beam of substantial height and width connected to the drum with its height generally perpendicular to the drum axis, and arranged to be flattened in height and coiled on the drum when the drum is rotated in one direction and to be uncoiled and returned to its original height when the drum is rotated in the opposite direction, the uncoiled beam extending arcuately out from and along the drum axis; and
   a plurality of longitudinally spaced serrations extending a substantial distance across the width of the beam to permit flattening of the arcuate beam without overstressing it.
10. A deployable solar array for a spacecraft comprising:
   a plurality of frusto-conical rollers rotatably mounted at spaced locations around the periphery of said spacecraft;
   motor means for selectively rotating said rollers in either direction upon command from a remote station;
   an elongate arcuate panel connected to each roller, and adapted to be coiled on the roller when the roller is rotated in one direction, and to extend arcuately out from and around the spacecraft when the roller is rotated in the other direction, the panel being fabricated of a fiberglass substrate having solar cells thereon;
   an elongate arcuate beam of relatively thin sheet metal extending along each longitudinal edge of the panel, each beam being fabricated of two halves each of which includes a central portion of semi-circular cross sectional configuration terminating in a pair of outwardly extending longitudinal flanges with the transition between the central portion and each flange being reverse-bent about a radius, the two haves of each beam being connected with their flanges mating to form a hollow beam with side flanges:
   a plurality of wedge-shaped serrations extended through each beam flange to approximately the vertex of the beam central portion to relieve stress if the beam is flattened and returned to its original shape, the serrations being disposed alternately on opposite sides of the beam at spaced locations along its length and each including a circular portion at the beam vertex; and
   means connecting the edges of the panel to the beams along the vertex of one beam half, to reduce transverse stress on the panel as the beam is flattened and returned to its original shape.

References Cited
UNITED STATES PATENTS

| | | | |
|---|---|---|---|
| 3,269,673 | 8/1966 | Reiniger | 244—1 X |
| 3,326,497 | 6/1967 | Michelsen | 244—1 |
| 3,364,631 | 1/1968 | Pleasants | 244—1 X |

FERGUS S. MIDDLETON, Primary Examiner

U.S. Cl. X.R.

136—89; 170—160.11